May 6, 1952     H. L. HILL     2,595,580
CONTROL MECHANISM FOR AUTOMOBILE WINDOWS AND THE LIKE
Filed Nov. 18, 1947     3 Sheets-Sheet 1
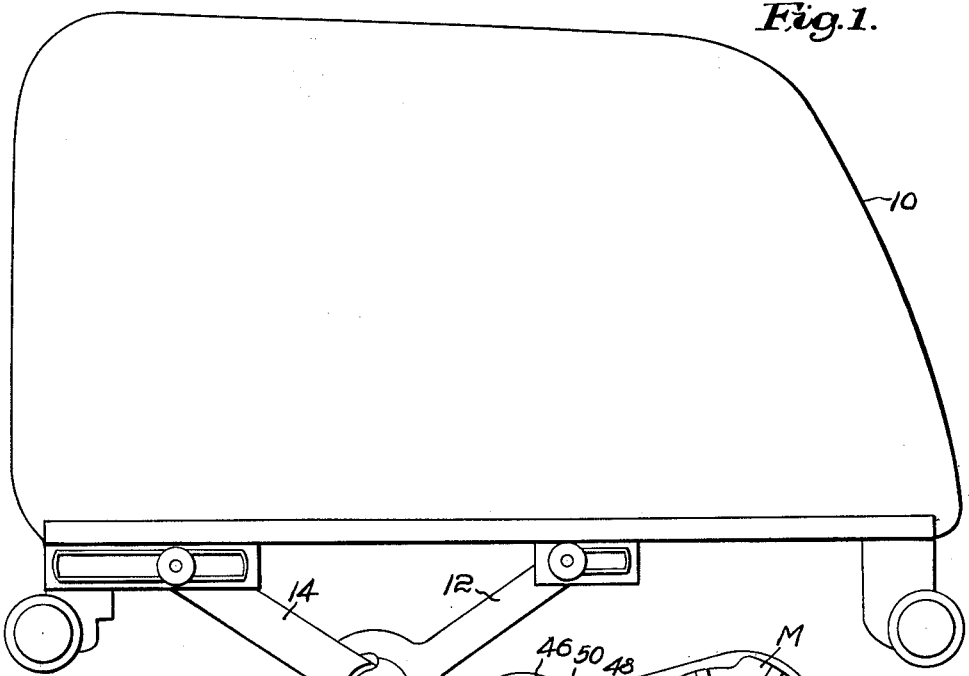
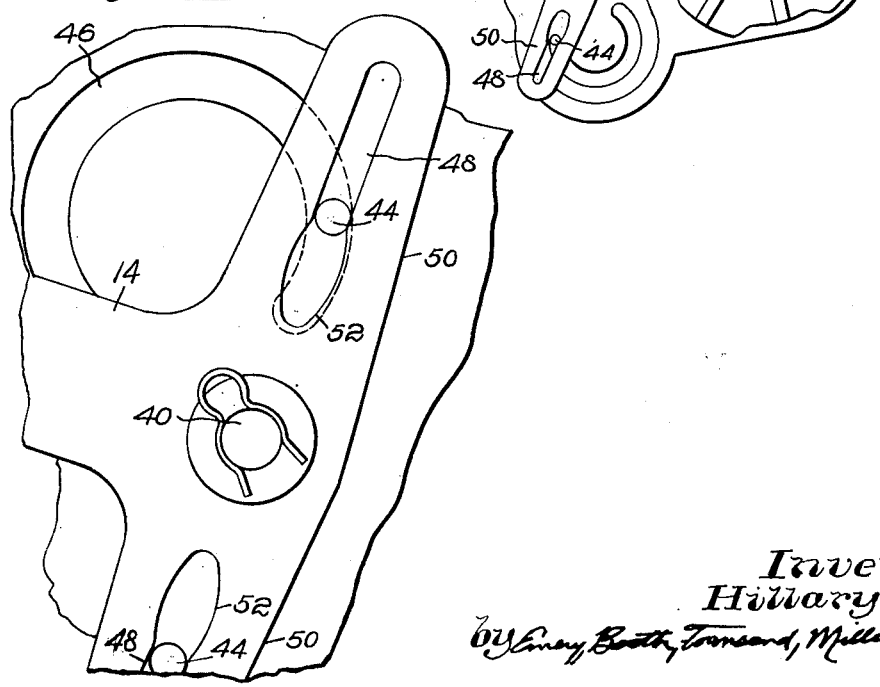
Inventor:
Hillary L. Hill.

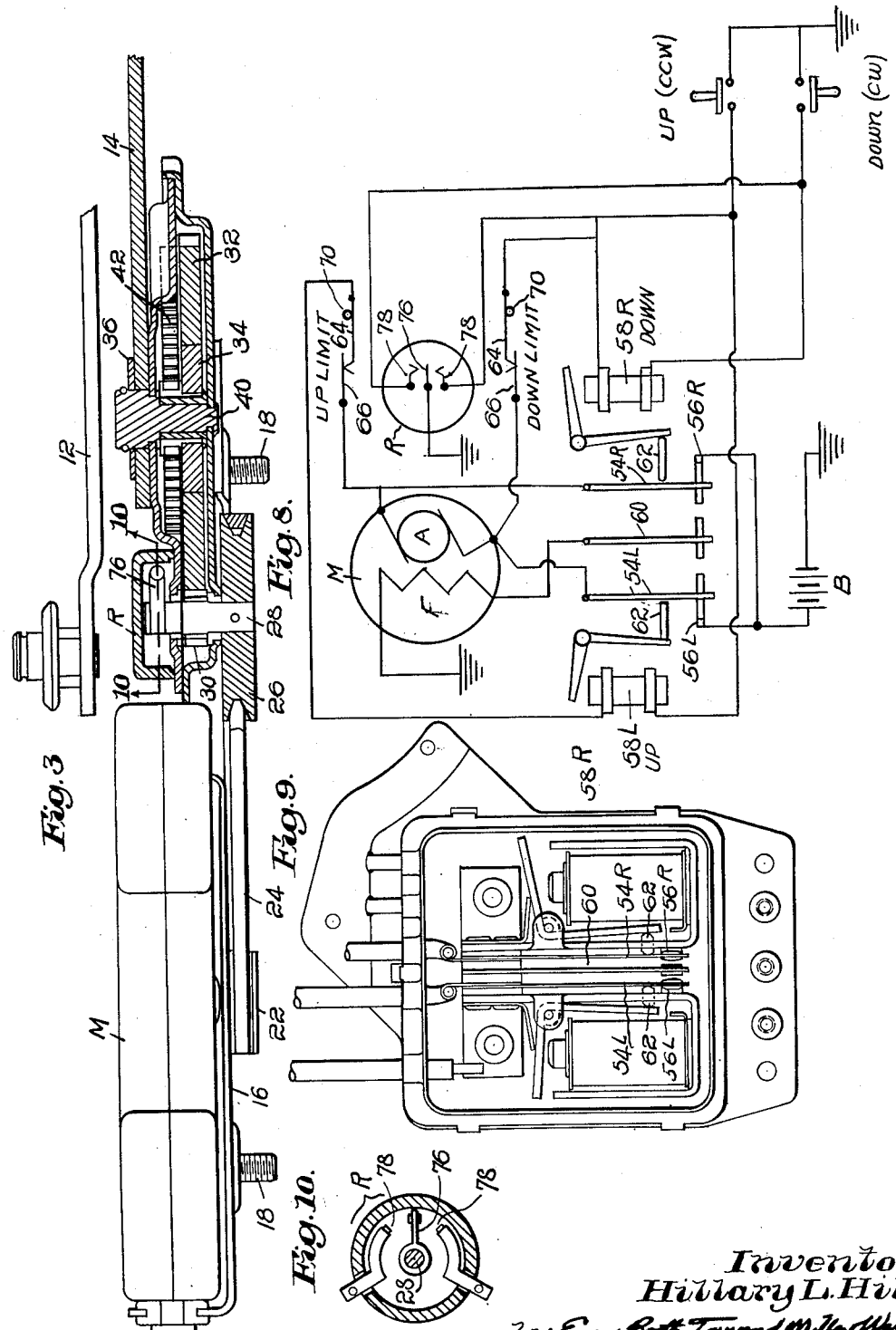

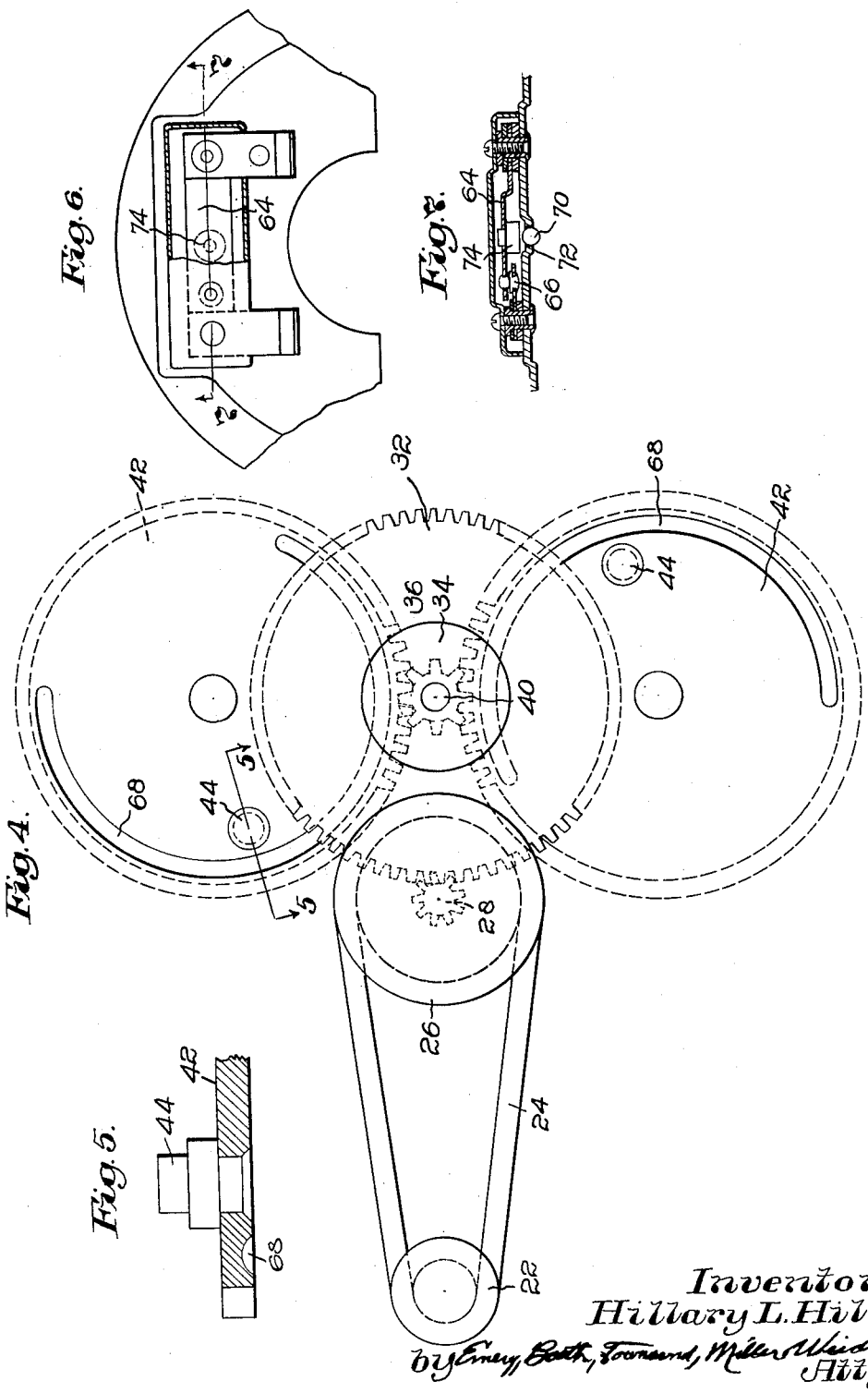

Patented May 6, 1952

2,595,580

UNITED STATES PATENT OFFICE 2,595,580

CONTROL MECHANISM FOR AUTOMOBILE WINDOWS AND THE LIKE

Hillary L. Hill, Detroit, Mich., assignor to A. S. Campbell Co., Inc., Boston, Mass., a corporation of Massachusetts Application November 18, 1947, Serial No. 786,717

9 Claims. (Cl. 268—124)

This invention relates to control mechanism for shifting an element back and forth along a determined path by the power of a motor which is under a simple manual control. An outstanding example of such an element, and one in the control of which I anticipate a major field for use of the invention, is the sliding window of an automobile door. I have herein illustrated a mechanism particularly designed for operation of such a window. For simplicity in the following description I shall refer to the element controlled as a window and speak of moving it up and down. Essentially the same mechanism might be applied to other uses wherein such words as "to and fro," "forward and back," "in and out" or the like might be more appropriate.

My invention will be well understood by the following description of the illustrative embodiment thereof shown by way of example in the accompanying drawings, wherein:

Fig. 1 is a view showing the sliding glass of an automobile window, with the lifting mechanism associated therewith. The body of the door is omitted. The point of view is that of one looking in from the exterior side of the car, the exterior panel of the lower part of the door which would cover the lifting mechanism not being shown;

Fig. 2 is an enlarged detail of a portion of Fig. 1;

Fig. 3 is a figure chiefly in horizontal section through the lifting mechanism. The interior side of the car is at the bottom of the figure and we are looking down. Hence right and left are interchanged relatively to Fig. 1;

Fig. 4 is an elevation showing the train of gearing between the motor and the lifting arm. The point of view is from the interior of the car;

Fig. 5 is a fragmentary section on line 5—5 of Fig. 4 on an enlarged scale;

Fig. 6 is an elevation of a portion of the outer side of the interiorly disposed wall of the gear casing with a part omitted, the portion shown being that in the 12 o'clock position relative to center 48 in Fig. 4;

Fig. 7 is a section on line 7—7 of Fig. 6 showing a limit switch;

Fig. 8 is a wiring diagram;

Fig. 9 is an elevation showing realistically certain relay-operated switches of the motor-controlling circuits; and Fig. 10 is a section on line 10—10 of Fig. 3 illustrating a switch, hereinafter termed the reversing switch.

In the following description I shall attempt to use the words "interior" and "exterior" as relating to the vehicle as a whole while by "inner" and "outer" I refer to the door structure as such. Thus the door may be considered as having an "interior" panel which has an "outer" face presented toward the interior of the vehicle and an "inner" face presented toward the exterior of the vehicle as a whole.

The idea of operating the sliding windows of automobiles by power is by no means new, and certain constructions for doing so have already been commercially used. Since the present-day automobile has a highly developed electrical system, it is desirable to use electric power. The idea of using a reversible electric motor for operating the window of an automobile is also not new, being disclosed at least as early as the British patent to La Riboisiere 15,648 of 1913. Many of the mechanisms described in the patent literature are obviously clumsy, bulky, and expensive. A construction illustrative of the present invention may be efficient yet cheap. It may be compactly organized to be housed between the exterior and interior panels of the usual door and may be hung from the latter in the manner of the regulator plate of the conventional hand-driven "regulator" and indeed may be provided as a unit or subassembly, which may be substituted for such a plate in a few minutes and with the simplest of hand tools.

Referring to Fig. 1 of the drawings, I there show a window-glass 10, adapted to be supported and vertically reciprocated by the cross-arms 12 and 14, the upper ends of which are slidably associated with the lower margin of the glass. The lower end of arm 12 is pivotably and slidably mounted permitting it to move, horizontally in the figure, in a line parallel to the lower margin of the glass as the arm swings while the arm 14 is oscillated to effect the movement of the window. This mechanism, which is essentially disclosed by the French patent to Cousinard 698,217 of 1930, is commonly used at the present day in hand-driven window regulators wherein the lower end of the arm 14 carries a gear segment cooperating with a pinion on the shaft of a hand-crank. It is here illustrated merely as an example of a mechanism for transmitting force from a fixed point of application to effect movement of the window. Herein the oscillation of arm 14 is effected through a suitable gear train from a reversible electric motor M.

The motor, the gearing by which the arm is driven, and at least certain of the current-controlling switches are conveniently and desirably organized as a subassembly which may be mounted on the interior panel of the door in place of the regulator plate or board of the conventional hand-driven regulator and indeed may be secured by positioning devices similarly located to suit holes in the panel provided for such a regulator plate, while the manually operated controlling mechanism for the circuits, herein diagrammed as a pair of push buttons, may be secured to the interior panel of the door in place of the rose of the usual hand-crank. I have considered it unessential to illustrate realistically the construction of this manually actuated control mechanism or its mounting on the door structure.

Referring to Fig. 3, the subassembly, above referred to, may comprise a plate 16 from which arise threaded studs 18 whereby it may be bolted to the interior panel of the door against the inner face thereof. It may be introduced into the space between the interior and exterior panels, through one of the openings of the interior panel with a button-holing motion, and secured to the margins of such opening. In Fig. 1 the subassembly is shown in an inclined position relative to the horizontal, because that is the position which it takes when assembled in one present-day model of car in the position occupied by the conventional regulator plate. In the other figures, however, the line between the motor shaft and center 40 is positioned horizontally. Suspended from the plate 16, conveniently through rubber mounting cushions 20, one of which is seen in Fig. 3, is a reversible electric motor M. For the purposes of the present description it is sufficient to say that the motor may be of the general type disclosed in my Patent 2,415,634. It is thin and flat so that it may readily be received in the space between the panels of the door with its rotor shaft substantially at right angles thereto. Thus, by way of illustration and without limitation thereto, I may remark that the present drawings illustrate an actual motor six inches in diameter and having an axial dimension including the overhanging pulley-carrying end of the rotor shaft of one and one-quarter (1¼) inches.

In the particular train of gearing illustrated in the drawings a pulley 22 on the motor shaft drives, by a V-belt 24, a pulley 26 on a jack-shaft 28. The shaft 28 carries a pinion 30 meshing with a large gear 32, preferably of fiber and having a metal center 34, in which center is splined the quill-shaft of a pinion 36 mounted to rotate on dead shaft 40. This pinion 36 meshes with upper and lower gears 42 as best seen in Fig. 4. From the gears wrist pins 44 (see Fig. 5) project toward the exterior, passing through suitable slots 46 (see Figs. 1 and 2) in the gear-casing and into slots 48 in a pair of oppositely extending unitary crank-arms 50 pivoted on the end of the dead shaft 40, these crank-arms being rigid with the inner end of the window-lifting arm 14, that arm and the cranks forming a T-shaped unit. The major portion of the slots 48 is straight, and the wrist-pins 44 cooperate with the straight portions of the slots to effect, on rotation of the gears in one or the other direction, the up or down movement of the window throughout the limits of its path.

The inner ends of the slots 48, however, are enlarged so that the motor may overrun without transmitting motion to the window. The margins 52 of these end portions of the slots radially outward from the centers of the gears 42 are curved concentrically with those centers. When the wrist-pins are engaged by the curved margins 52 of the slots, the window is locked in its extreme up or down position. Any movement of the cranks 50 about the center 40 is resisted by the wrist-pins, which are in dead-center position relative to the pinion centers.

The electrical control of the motor may now conveniently be described, reference being made primarily to the wiring diagram (Fig. 8). The mechanism is controlled by what is essentially a manually operated double-throw switch, which normally returns to neutral position unless held in one or another of its closed positons by hand. I have thought it clearest herein to diagram this switch as a pair of push buttons, one of which, marked "Up" in the diagram, is depressed to raise the window, and the other, marked "Down" in the diagram, is depressed to lower it. These buttons act through a relay mechanism which it will be convenient first to describe with reference to the diagram, Fig. 8, and to Fig. 9 where the corresponding parts are more realistically shown.

The relay-switch assembly shown comprises two double-throw switch arms 54R and 54L, which it will be convenient to refer to as the right- and left-hand switch arms, respectively. These arms are spring arms, having contacts at opposite sides thereof, the outer of which normally rest against contacts 56R and 56L, respectively, on the frames which support electro-magnets 58R and 58L designated in the wiring diagram as "Down" and "Up." Between the arms 54R and 54L is a central arm 60, having contacts facing toward the inwardly facing contacts on the two lateral arms but normally spaced therefrom. On energization of one or the other of the magnets, its armature operates a push-rod 62 to deflect the lateral switch arm 54, adjacent to which the magnet is mounted toward the center to break its connection to a contact 56 and make connection with a contact on the central arm 60.

After this preliminary description, we may trace the principal circuits. If the "Up" button is depressed, a circuit is closed from the battery B through contact 56R and right-hand arm 54R, the "Up" limit switch, so-marked in Fig. 8, the "Up" magnet 58L through the "Up" push button to ground. The magnet is energized and the left-hand switch arm 54L is moved to the right, closing into cooperation with the central arm 60. This closes the motor-energizing circuit from the battery B through right-hand arm 54R, to the armature A of the motor, to left-hand arm 54L, to central arm 60, to the field of the motor, and to ground. When the wrist pins 44 of the upper gear 42 reaches the end of its stroke, the "Up" limit switch will be opened, conveniently in the manner hereinafter to be described, de-energizing the "Up" magnet 58L and permitting the parts to return to the positions of Fig. 8.

If the "Down" button is depressed, it closes a circuit from the battery B through left-hand arm 54L, "Down" limit switch, "Down" magnet 58R, through the push button to ground. The operation of the "Down" magnet shifts right-hand arm 54R to the left to cooperate with a contact on central arm 60 and closes a motor-energizing circuit from the battery B through the left-hand arm 54L, through the armature A to the right-hand arm 54R, to the central arm 60, to the field F, to ground. It will be noted that the flow of current through the armature is in the opposite direction to that which occurred when the "Up" button was depressed; the motor is reversed, the oscillation of arm 14 is in the other direction, and the movement of the window is downward.

The motor runs only while a push button is depressed and its corresponding magnet energized. If the window has moved half way and the button is released the magnet is de-energized, switch arm 54R or 54L as the case may be springs back to open position, and the motor and the window stop.

I shall next describe the particular construction of limit switches shown, referring in particular to Figs. 6 and 7. The limit switches are mounted on the gear casing at the interior side of the subassembly in 12 o'clock and 6 o'clock positions relative to the center 40. Herein each comprises a spring arm 64 normally resting against a contact 66. To open the switches the following mechanism is provided. On the face of each gear 42 (see Figs. 4 and 5) is coined a groove 68, which partially receives a ball 70, which rests in a hole 72 in the gear casing and bears against a block of insulating material 74 carried by arm 64. The spring pressure of the arm normally thrusts the ball into the groove 68, in which it travels throughout the up and down movement of the window between the extremes thereof. Considering the "Up" switch and referring to Fig. 4, when the window has reached its upper limit, the end of the groove 68 comes to the 12 o'clock position and the ball is carried outwardly from the face of the gear in a direction axial to the latter and is thrust against the switch arm 64 to lift it away from contact 66, opening the "Up" limit switch. The action of the lower limit switch is similar.

An important feature of my invention is the inclusion in the combination of what I term a reversing switch R. Referring to Figs. 8 and 10, this comprises a grounded switch arm 76, having a looped or hub-like end fitting the end of pinion shaft 28 to be driven thereby with an easy friction. This arm extends between two contacts 78 being normally spaced from both. Now referring to Fig. 10, if the "Up" button is depressed, the motor starts to revolve, the shaft 28 turns in a counterclockwise direction, viewing that figure, and arm 76 is moved up against the upper contact 78 where it remains, its hub slipping on the shaft 28 as the motor continues to turn the latter. When the "Up" button is released and the left-hand switch arm 54L returns to the position of the drawings, the energizing circuit for magnet 58R, which we above traced through the "Down" push button, is completed in series through switch pair 56L and 54L then through the upper contact 78 and the arm 76 to ground instead of through the "Down" push button, which is open. In other words the arm 76 and the upper contact 78 constitute a shunt around the "Down" push button. Through this shunt, by the agency of relay magnet 58R, the "down" energizing circuit of the motor is completed. The current through the armature of the motor is thus reversed, but as soon as the motor has made about a single revolution in the reverse direction, the arm 76 is moved back to the open position shown, and the parts resume the position in the diagram. The movements of the arm 76 are very slight. Similarly when the window is moved down, arm 76 closes on the lower contact 78 and temporarily reverses the motor when the "Down" push button is released.

A further important function is subserved by the reversing switch R. Let us suppose that the glass is partially raised, say being open a few inches at the top of the door, sufficient to admit the fingers. If the glass could be pushed down from the exterior, the car could easily be entered. Such movement, however, tends to rotate pinion shaft clockwise, and on a very slight movement arm 76 closes against the lower contact 78, causing current to flow to the "Up" magnet 58L. The motor is immediately energized to effect an up movement of the glass, and, as it has a powerful mechanical advantage, through the gear train, it effectually resists manual depression of the window. As the motor moves pinion shaft 28 counterclockwise, the arm 76 moves back to the upper contact, and, when the pressure is released, the motor reverses itself and comes to a stop as already described. There is no perceptible movement of the window glass in either direction.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. A power-operated device for a reciprocable part comprising a swinging lifter arm for actuating said part having a slotted crank, an electric motor, and a train of mechanism driven thereby comprising a gear having a wrist pin entering the slot of the crank, the margin of the slot at one end being curved concentrically to the center of the gear.

2. A power-operated device for a reciprocable part comprising a swinging lifter arm for actuating said part having a slotted crank, an electric motor, a train of mechanism driven thereby comprising a gear having a wrist pin entering the slot of the crank, the margin of the slot at one end being curved concentrically to the center of the gear, and a limit switch controlling the energization of the motor which is opened when the wrist pin enters the curved portion of the slot.

3. A power-operated device for a reciprocable part comprising a swinging lifter arm for actuating said part having a slotted crank, an electric motor, a train of mechanism driven thereby comprising a gear having a wrist pin entering the slot of the crank, a limit switch controlling the energization of the motor adapted to be opened when the wrist pin approaches the end of the slot and a cam mechanism carried by the gear for operating the switch.

4. A power-operated device for a reciprocable part comprising a swinging lifter arm for actuating said part having a slotted crank, an electric motor, a train of mechanism driven thereby comprising a gear having a wrist pin entering the slot of the crank, a limit switch controlling the energization of the motor adapted to be opened when the wrist pin approaches the end of the slot and a cam mechanism carried by the face of the gear for operating the switch.

5. A power-operated device for a reciprocable part comprising a swinging lifter arm for actuating said part having a slotted crank, an electric motor, a train of mechanism driven thereby comprising a gear having a wrist pin entering the slot of the crank, a limit switch controlling the energization of the motor adapted to be opened when the wrist pin approaches the end of the slot, the face of the gear having a groove therein concentric with its center, and a follower in the groove shifted axially of the gear as the groove moves away from it, the switch having a movable element opposing the follower which element is moved to open position on such axial movement of the follower.

6. A power-operated device for a reciprocable part comprising a swinging lifter arm for actuating said part having a T-head providing opposed slotted crank arms, an electric motor, and a train of mechanism driven therefrom comprising a pinion aligned with the pivotal center of the arm and gears at either side thereof meshing therewith, the gears having wrist pins entering the slots of the cranks respectively.

7. A power-operated device for a reciprocating part comprising a reversible electric motor and a train of mechanism taking motion from the motor for connection to said part to move the part up or down, as the case may be, according to the motor's direction of rotation, a source of power for said motor, two motor circuits connecting said motor to said source of power so as to provide different current paths from said source through the motor armature, each circuit including a double throw switch connected between the armature winding and the field winding of the motor, said switches being normally positioned so as to prevent energization of the motor, a relay to actuate each of said double throw switches, an energizing circuit for each relay connecting said relay to the source of power, each of said energizing circuits including a manually operated switch for selectively energizing one of the relays to displace one of said double throw switches into its closed position thereby closing one of the motor circuits to effect rotation of the motor in a desired direction, and a switch driven by said motor driven mechanism to temporarily connect through auxiliary circuit means the previously non-energized relay to the source of power through the displaced double throw switch, as said displaced switch moves back to its initial position following release of the manual switch, to thereby close the previously open motor circuit.

8. A power-operated device for a reciprocating part comprising a reversible electric motor and a train of mechanism taking motion from the motor for connection to said part to move the part up or down, as the case may be, according to the motor's direction of rotation, said mechanism including a rotating shaft, a source of power for said motor, two motor circuits connecting said motor to said source of power so as to provide different current paths from said source through the motor armature, each circuit including a double throw switch connected between the armature winding and the field winding of the motor, said switches being normally positioned so as to prevent energization of the motor, a relay to actuate each of said double throw switches, an energizing circuit for each relay connecting said relay to the source of power, each of said energizing circuits including a manually operated switch for selectively energizing one of the relays to displace one of said double throw switches into its closed position thereby closing one of the motor circuits to effect rotation of the motor in a desired direction, a switch including an electrically grounded switch arm frictionally driven by the rotating shaft in slipping relationship therewith when restrained, and a pair of contacts spaced from each other on opposite sides of the switch arm to limit the movement of said switch arm, and auxiliary circuits connecting said power source to each of said switch contacts through the relays and double pole switches, the said switch arm closing one of the auxiliary circuits upon engaging one of the switch contacts after the displaced double throw switch has moved back to its initial position following release of the manual switch, to thereby close the previously open motor circuit until the motor so energized rotates the shaft to move the switch arm out of engagement with the previously engaged contact.

9. In combination with a reciprocating closure for an opening which gives access to an enclosed space a reversible electric motor, a train of mechanism to said closure effective to move the closure up or down, as the case may be, according to the motor's direction of rotation including a rotating shaft in positive driving and driven relation to the closure whereby not only does rotation of the shaft operate the closure but also force applied to the closure tends to rotate the shaft, two motor circuits connecting said motor to said source of power so as to provide different current paths from said source through the motor armature, each circuit including a double throw switch connected between the armature winding and the field winding of the motor, said switches being normally positioned so as to prevent energization of the motor, a relay to actuate each of said double throw switches, an energizing circuit for each relay connecting said relay to the source of power, each of said energizing circuits including a manually operated switch for selectively energizing one of the relays to displace one of said double throw switches into its closed position thereby closing one of the motor circuits to effect rotation of the motor in a desired direction, a switch including an electrically grounded switch arm frictionally driven by the rotating shaft in slipping relationship therewith when restrained, and a pair of contacts spaced from each other on opposite sides of the switch arm to limit the movement of said switch arm, and auxiliary circuits connecting said power source to each of said switch contacts through the relays and double pole switches, the said switch arm closing one of the auxiliary circuits upon engaging one of the switch contacts after the displaced double throw switch has moved back to its initial position following release of the manual switch, to thereby close the previously open motor circuit until the shaft is rotated by the motor in the reverse direction to drive the switch arm out of engagement with the previously engaged switch contact, the said switch arm also being responsive to forces applied to the closure transmitted through said shaft to reclose a motor circuit and thereby oppose the force applied to the closure.

HILLARY L. HILL.

REFERENCES CITED

The following references are of record in the file of this patent:

UNITED STATES PATENTS

| Number | Name | Date |
|---|---|---|
| 1,109,850 | Lindquist | Sept. 8, 1914 |
| 1,740,436 | Kimball | Dec. 17, 1929 |
| 1,853,826 | Lockett | Apr. 12, 1932 |
| 2,187,095 | Piper | Jan. 16, 1940 |
| 2,232,418 | Warren | Feb. 18, 1941 |
| 2,317,490 | Simpson | Apr. 27, 1943 |
| 2,378,262 | Vallen | June 12, 1945 |
| 2,382,791 | Hill | Aug. 14, 1945 |
| 2,417,795 | Yardeny | Mar. 18, 1947 |